United States Patent [19]

Kawai et al.

[11] Patent Number: 5,028,807
[45] Date of Patent: Jul. 2, 1991

[54] LOAD CELL WITH BASE PLATE

[75] Inventors: Masayasu Kawai; Yoshisaburo Tohdoh; Koji Sakata, all of Chofu, Japan

[73] Assignee: Kyowa Electronic Instruments Co., Ltd., Tokyo, Japan

[21] Appl. No.: 339,595

[22] Filed: Apr. 14, 1989

[30] Foreign Application Priority Data

Jul. 11, 1988 [JP] Japan .................. 63-170997

[51] Int. Cl.$^5$ .............................. H01H 35/00
[52] U.S. Cl. ...................... 307/119; 73/855
[58] Field of Search ............ 207/119; 73/855, 886

[56] References Cited

U.S. PATENT DOCUMENTS 3,240,055  3/1966  Eddens ............................. 73/855
3,422,445  1/1969  Jacobson ........................ 73/855 X Primary Examiner—Derek S. Jennings
Attorney, Agent, or Firm—Lane, Aitken & McCann

[57] ABSTRACT

A load cell includes a load sensing section which is formed by a rigid load introduction section, a rigid load support section and a strain sensing section, and a base plate having a neck and two parallel plate-shaped rigid sections. One part of the plate-shaped rigid section of the base plate is integratedly fixed to the load sensing section, and the strain gauges are mounted on the strain sensing section formed on the load sensing section so as to detect a load applied to the load introduction section and convert the magnitude of a measured load into a quantity of electricity.

3 Claims, 6 Drawing Sheets

LOAD CELL WITH BASE PLATE

BACKGROUND OF THE INVENTION

1. Field of the Invention

The present invention relates to a load cell with a base plate, and more particularly, to a load cell with a base plate integratedly fixed to a load support section and able to detect the magnitude of a load in terms of a quantity of electricity.

2. Description of the Prior Art

Various configurations of a strain sensing section of a load cell have been proposed to meet configurations and accuracy requirements, such as a small-size or thin-shape load cell, and are in practical use.

The most popular type of load cell used for measuring a heavy load has a strain gauge attached to a shear beam fixed at both ends, as this effectively prevents movement of a load application point.

FIG. 6 is a plan view of a load cell and FIG. 7 is a cross sectional view taken along the line 7—7 of FIG. 6, and these figures respectively depict the construction of major sections of a prior art load cell comprising a shear beam fixed at both ends.

As shown in the figures, a load cell 1 comprises a cylindrical outer shell section 2 for supporting a load, a load seat 3 installed at the center of the outer shell section 2 to accomodate a load to be measured, a load transmission section 4 formed coaxially and as one body with the load seat 3 for transmitting a load accomodated on the load seat 3 to a strain sensing section, described later, four cross-shaped shear beams 5, 6, 7, and 8 connected to the outer periphery of the load transmission section 4 and the inner periphery of the outer shell section 2. The middle sections of the shear beams 5 to 8 serve as strain sensing sections 5a, 6a, 7a, and 8a respectively, and a strain gauge SG is attached to each of the strain sensing section 5a to 8a in parallel to the load axes thereof respectively, for detecting a shear strain. More specifically, the respective strain gauges SG are attached with the load sensing axes thereof arranged at angles of 45 deg. and 135 deg. to the load axes, respectively.

The functions of the prior art load cell 1 are described in the following. When a load W to be measured is applied to the load seat 3, the load W is transmitted to the inner ends of the shear beams 5 to 8 through the load transmission section 4, which has a greater rigidity. The reaction force, which is identical to the load W in magnitude but opposite to the load W in direction, is transmitted to the outer ends of the shear beams 5 to 8 through the outer shell section 2. Accordingly a shear force acts on the shear beams 5 to 8, to thereby generate a shear stress on the strain sensing sections 5a to 8a, respectively. The shear stress thus generated is converted into a quantity of electricity (change in electric resistance) and detected by the strain gauges SG mounted on the strain sensing sections 5a to 8a.

This prior art load cell 1 has the following drawbacks:

First, it is often impossible to maintain a required rigidity of the outer shell section 2, and therefore, the outer shell section 2 is sometimes deformed, thereby producing a moment which causes a warping of the strain sensing sections 5a to 8a, even if the load W is applied along the direction of the load axes. The errors due to the bending moment described above become a part of, or are added to the load detection output.

Namely, the load cell 1 described above, allows the generation of shear stress (bending moment) based on a normal deformation as illustrated in FIG. 8, of the strain sensing sections 5a to 8a, and can obtain a strain output equivalent to the shear stress, using the above strain gauges, when the outer shell section 2 is fixed to a solid member and thus can not move.

Nevertheless, if it is impossible to maintain a satisfactory rigidity of the outer shell section 2 due to limitations of the outer configuration thereof, when a load W is applied, a clockwise bending moment M will be produced on the load transmission section 4 side of the strain sensing section 6a, as illustrated in FIG. 9, thereby sensing both a bending stress and a shear stress on the strain sensing section 6a when a counterclockwise bending moment M' is imposed on the outer shell section 2 of the strain sensing section 6a. Since the strain generated based on the bending moments M and M' is affected by friction between an outer surface of the object being measured and the facing surface of the outer shell section 2, the strain thus generated will not be proportional to the applied load, an accurate electric measurement of the load by a Wheatstone bridge cannot be obtained and resultant errors will be added to the load detection output.

If an attempt is made to increase the rigidity of the outer shell section 2, to eliminate the above first drawback, the wall thickness of the outer shell section 2 in the load axial direction or the radial direction thereof must be increased, but if a load detection output having a greater accuracy is required, the wall thickness of the outer shell section 2 must be greatly increased, and this is obviously not a practical way of solving the above problems, due to a resulting limitation of the subject to be measured.

SUMMARY OF THE INVENTION

The present invention has been made in consideration of the circumstances described above, and therefore, a primary object of the present invention is to provide a load cell having a simple construction, light weight and small size, and capable of inhibiting deformation of a load support section even when unable to maintain a required rigidity of the load support section, preventing the inclusion of measurement errors caused by the bending moment due to such deformation in the detected output, and capable of effectively preventing an inclusion of measurement errors, caused by a deformation or an inclination of a subject to be measured, in the detected output, to thereby obtain an accurate measurement.

To realize the aforesaid object, the present invention is characterized in that the load cell, which is adapted to detect a load through a strain gauge and convert the magnitude of the load into a quantity of electricity is composed of a load sensing section which comprises a rigid cylindrical load introduction section having an axial center conforming to the load axis, a rigid load support section surrounding the load introduction section at a specified distance, and a strain sensing section extending from the load introduction section in a radial direction, and having an inner end integratedly linked to the load introduction section, and an outer end integratedly linked to the load support section, and which is elastically deformed when a force is exerted on the load introduction section along the load axis when the load support section is supported, and a base plate having a neck formed in the middle thereof by which it is aligned with the load axis, and forming two rigid plate-shaped sections arranged in parallel in such a manner that they can clamp the neck and one part of the plate-shaped rigid sections can be fixed integratedly to and in contact with the load support section of the load sensing section to convert the magnitude of a load to be measured, which is applied to the load introduction section, by the strain gauges mounted on the strain sensing section formed on the load sensing section for detecting a load.

BRIEF DESCRIPTION OF THE DRAWINGS

The present invention will now be described in detail by way of embodiments thereof, with reference to the accompanying drawings, wherein:

FIG. 6 is a plan view of the construction of the prior art load cell;

FIG. 7 is a cross sectional view taken along the line 7 to 7 of FIG. 6; and

DESCRIPTION OF THE PREFERRED EMBODIMENTS

Figure 1:
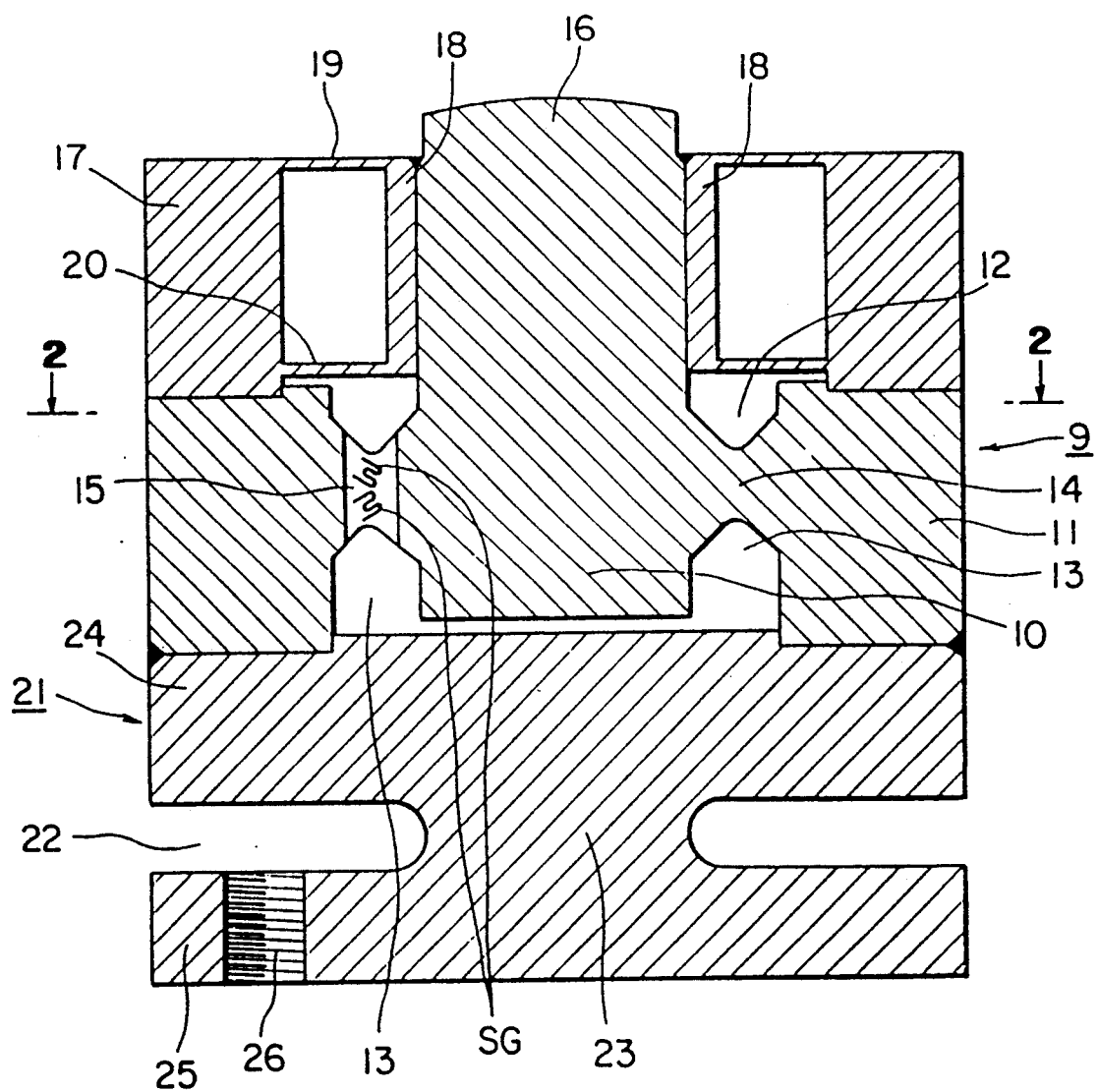
FIG. 1 is a cross sectional view taken along the line 1 to 0 to 1 of FIG. 2, and depicts the construction of a first embodiment of a load cell with a base plate according to the present invention.
Figure 2:
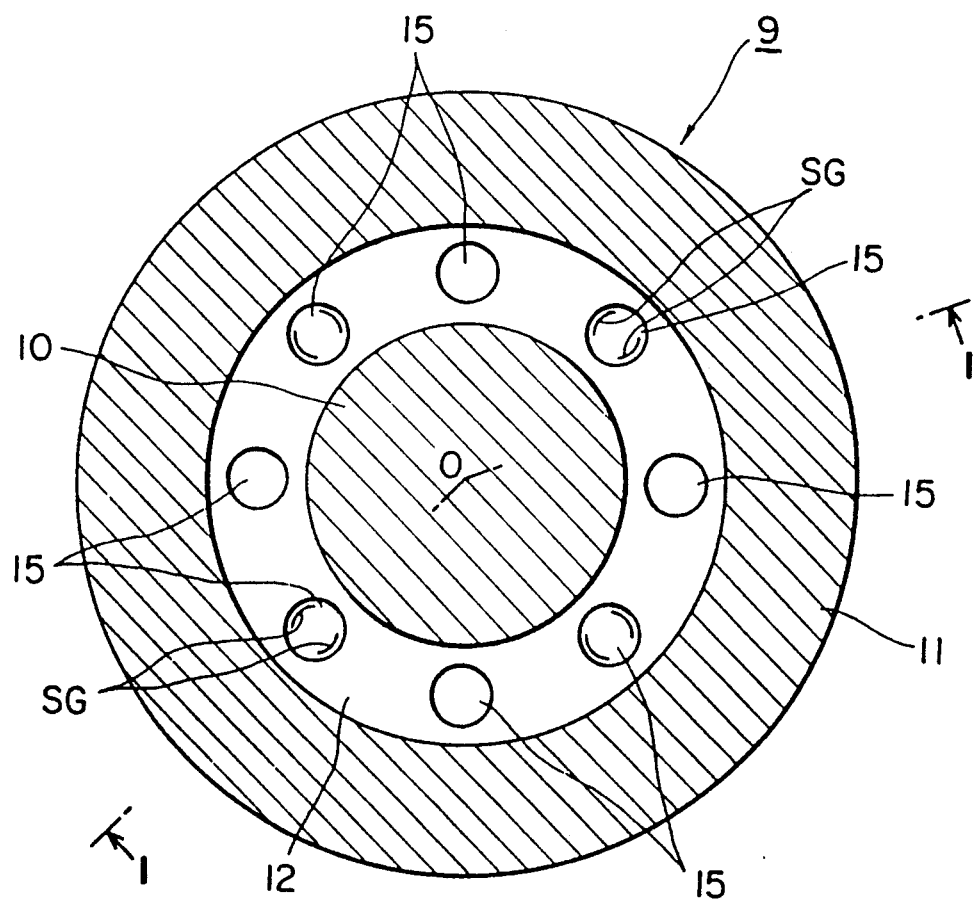
FIG. 2 is a cross sectional view taken along the line 2 to 2 of FIG. 1.

The embodiments of the present invention will be described with reference to the accompanying drawings:

FIGS. 1 and 2 are cross sectional views taken along the line 1 to 0 to 1 of FIG. 2 and along the line 2 to 2 of FIG. 1, respectively, and illustrate the construction of a load cell according to the present invention.

Referring to the above drawings, 9 denotes a load cell having a cylindrically shaped body and integratedly fastened to respective parts as described hereafter; 10 denotes a rigid load introduction member in the shape of a solid cylinder (not hollow) and formed in such a manner that the center of the axis thereof conforms to the load axis. A rigid load support section 11 in the shape of a solid cylinder surrounds the load introduction section 10 at a specified distance.

Ring-shaped recessed grooves 12 and 13 having a specified depth are formed between the load introduction section 10 and the load support section 11 in such a manner that a fixed thickness is maintained from one end surface crossing the load axis at a right angle and the other end surfaces in the center, respectively (In FIG. 1, this refers to the upper surface and the lower surface, respectively.) A relatively thin portion between the respective bottom surfaces of the ring-shaped recessed grooves 12 and 13 is called a strain sensing section 14. The bottoms (the bottom surfaces) of the grooves 12 and 13 are substantially V-shaped when viewed in cross section.

Namely, the strain sensing section 14 extends radially from the load introduction section 10 and as a result, the inner end (the inner peripheral edge) thereof is integratedly linked to the load introduction section 10 and the outer end (the outer peripheral edge) thereof is integratedly linked to the load support section 11.

Furthermore, in the middle of the strain sensing section 14 in the radial direction thereof are provided a plurality of small diameter through holes 15 having the centers thereof in the same radius and equally spaced at the same angle. A plurality of strain gauges SG for detecting shear stress, the load sensing axes of which are oriented at angles of 45 deg. and 135 deg. to the load axis, are mounted on the inner wall surfaces of every other through hole 15 by, for example, bonding, deposition, and spattering each through hole 15.

The upper part of the load introduction section 10 is integratedly linked with a rigid load receiving seat 16 in the shape of a solid cylinder shape (not hollow), the axial center of which conforms to the load axis.

In this embodiment, the load introduction section 10, the strain sensing section 14 and the load support section 11 are formed as an integral unit, and thus these parts will be hereinafter referred to as the "load sensing section".

Furthermore, the load introduction section 10 and the load receiving seat 16 are also formed as an integral unit, and thus the load receiving seat 16 and the load sensing section are formed as an integral unit, and therefore, these sections will be hereinafter referred to as "the main body of the load cell".

The ring-shaped recessed grooves 12 and 13 are machined by a lathe.

An external cylinder section 17, which is thinner than the load support section 11, but has a satisfactory thickness and rigidity, is brought into contact with the upper surface of the load support section 11, and the outer peripheral surfaces of the contacting parts thereof are welded to a required depth by, for example, electron beam welding or laser beam welding. Further, an internal cylinder 18, which is relatively thick, is fitted into the outer peripheral surface of the load receiving seat 16 and the upper edges of the thus fitted members are welded by a means similar to the above. Integratedly linked between the internal cylinder section 18 and the external cylinder section 17 are two thin disk-shaped diaphragms 19 and 20 which are arranged in parallel and connected at the upper ends and the lower ends thereof. Hereinafter, the member which comprises the external cylinder section 17, the external cylinder section 18 and the diaphragms 19 and 20 will be referred to as the "parallelogram diaphragm".

A base plate 21 which receives a reaction to an applied load from a subject to be measured and in contact therewith is fixedly welded to the lower end surface of the above load support section 11 by a welding means similar to that described above, for example, electron beam welding and the like. A neck 23 is provided in the base plate 21 by forming a groove 22 to a specified depth in the middle of the thick cylindrical member and at the upper and lower sides thereof, and extending toward the axial center from the outer peripheral surface thereof. As a result, two plate-shaped rigid sections 24 and 25 are formed substantially in parallel with each other and are able to clamp the neck 23.

On the lower side of the parts near to the peripheral edge of the plate-shaped rigid sections 24 and 25 are formed a plurality of threaded holes 26 into which mounting bolts (not shown) are screwed to fix the main body of the load cell holding a subject to be measured, via the base plate 21.

The operation and effects of the above first embodiment will be described hereafter.

When a load from a subject to be measured is applied to the load receiving seat 16 of the main body of the load cell, the load is transmitted to the strain sensing section 14 via the load introduction section 10. On the other hand, the reaction to the load received by the base plate 21 from the other surface of the measured subject (not shown) is transmitted to the strain sensing section 14 via the base plate 21 and the load support section 11, and as a result, a shear stress is generated at the strain sensing section 14. This shear stress is converted into a quantity of electricity (change in electric resistance) by the strain gauge SG attached to the strain sensing section 14. For example, this converted value is obtained from a Wheatstone bridge circuit (not shown) which is composed of four strain gauges SG.

If a lateral load or unbalanced load is applied to the load cell 9 in this embodiment, the load receiving seat 16 and the load introduction section 10 are tilted together on their axial centers relative to the load axis, but the inclination of the load receiving seat 16 and the load introduction section 10 is restrained, because the diaphragms 19 and 20 are integratedly linked to each other between the outer periphery of the load receiving seat 16 and the external cylinder section 17, such that they are axially separated at a specified distance and thus form a parallelogram diaphragm. As a result, the effect of a lateral load or unbalanced load is reduced, and thus a shear stress equivalent to an applied load acting in the axial direction is generated at the strain sensing section 14.

Although the diaphragms 19 and 20, which are parallelogram-shaped, are able to restrain a lateral load or unbalanced load as described above, they may be omitted due if the balance is accurate. Nevertheless, these elements are able to protect the strain gauges SG from humidity in addition to restraining the load, and therefore, are preferably installed.

Figure 8:
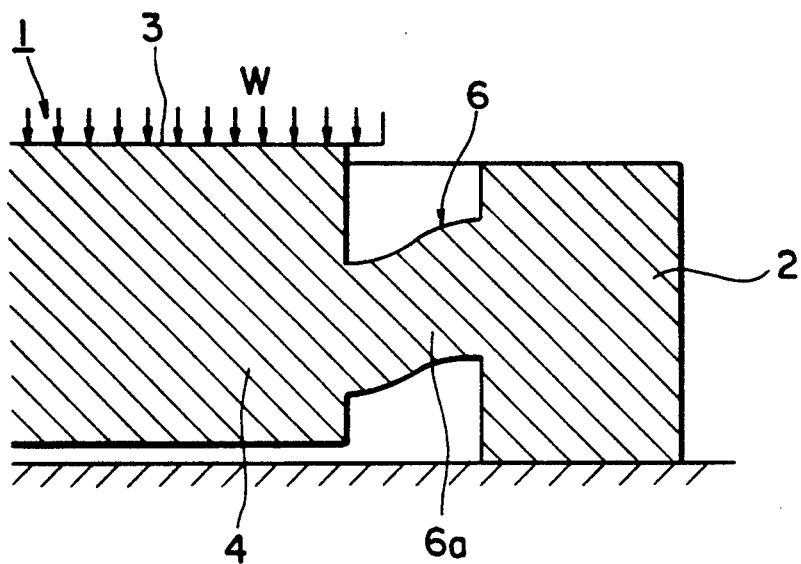
FIGS. 8 and 9 are enlarged cross sectional views for explaining the drawbacks of the prior art embodiment.
Figure 9:
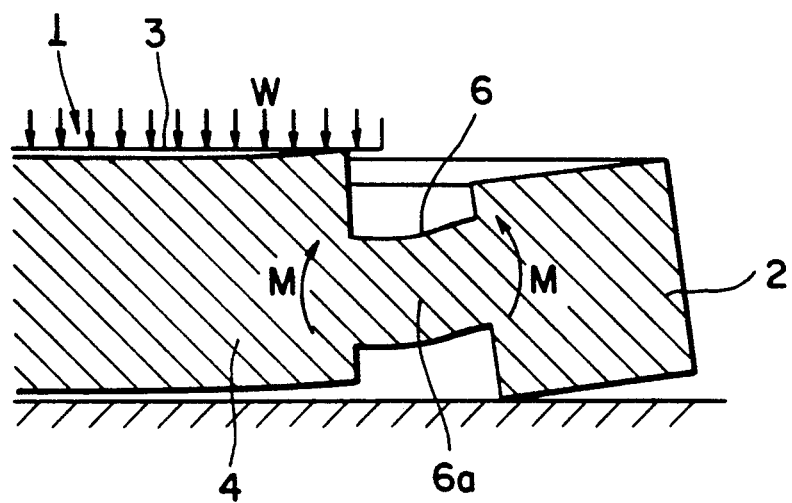

Since the lower end of the load support section 11 is fixed to the plate-shaped rigid section 24, no adverse effect upon the output of detection caused by the generation of a bending moment, as shown in FIG. 8, will occur even when subject to a heavy load. Therefore, the strain sensing section 14 generates a shear stress conforming to the load to be measured and can accurately detect the shear load due to the use of the strain gauges SG.

Even when the contacting surface of a subject to be measured brought into contact with the base plate 21, or more precisely, with the bottom surface of the plate-shaped rigid section 25, is soft or uneven, although they may cause an unbalanced distribution of the load, the above construction makes it possible for the load to be concentrated at the neck 23, and further, to substantially spread the load by using the plate-shaped rigid section 24 and thus transmit a balanced load to the load support section 11, thereby sharply reducing the effect produced by the contact between the subject to be measured and the base plate 21.

Even when the load cell 9 according to the preferred embodiment is used under unfavorable conditions, such as a high temperature or humidity, the upper end of the load sensing section is blocked by the parallelogram diaphragm and the lower end of the load sensing section is blocked by the base plate 21, thereby preventing an ingress of moisture to the internal parts of the through holes 20 and 21 to which the strain gauges are mounted, and effectively eliminating an insulation failure caused by an absorption of moisture or by oxidation, to thereby maintain a stabilized accuracy over a long period.

Figure 3:
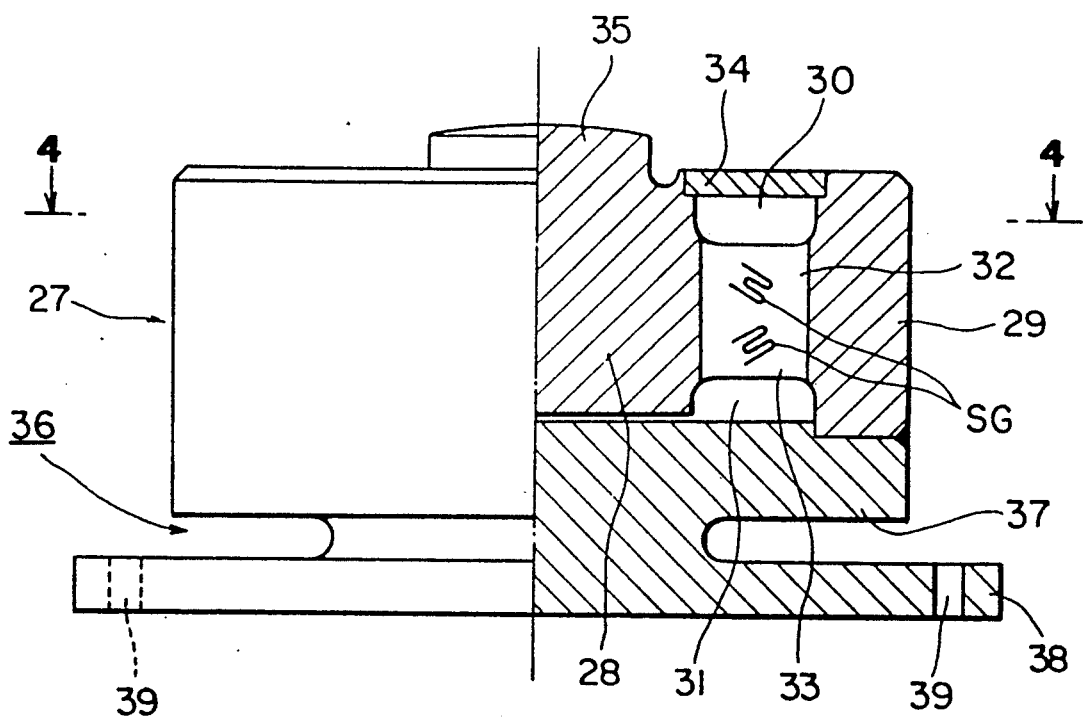
FIG. 3 is a front view in half cross section on the right side and illustrates the construction of a second embodiment of a load cell with a base plate according to the present invention.
Figure 4:
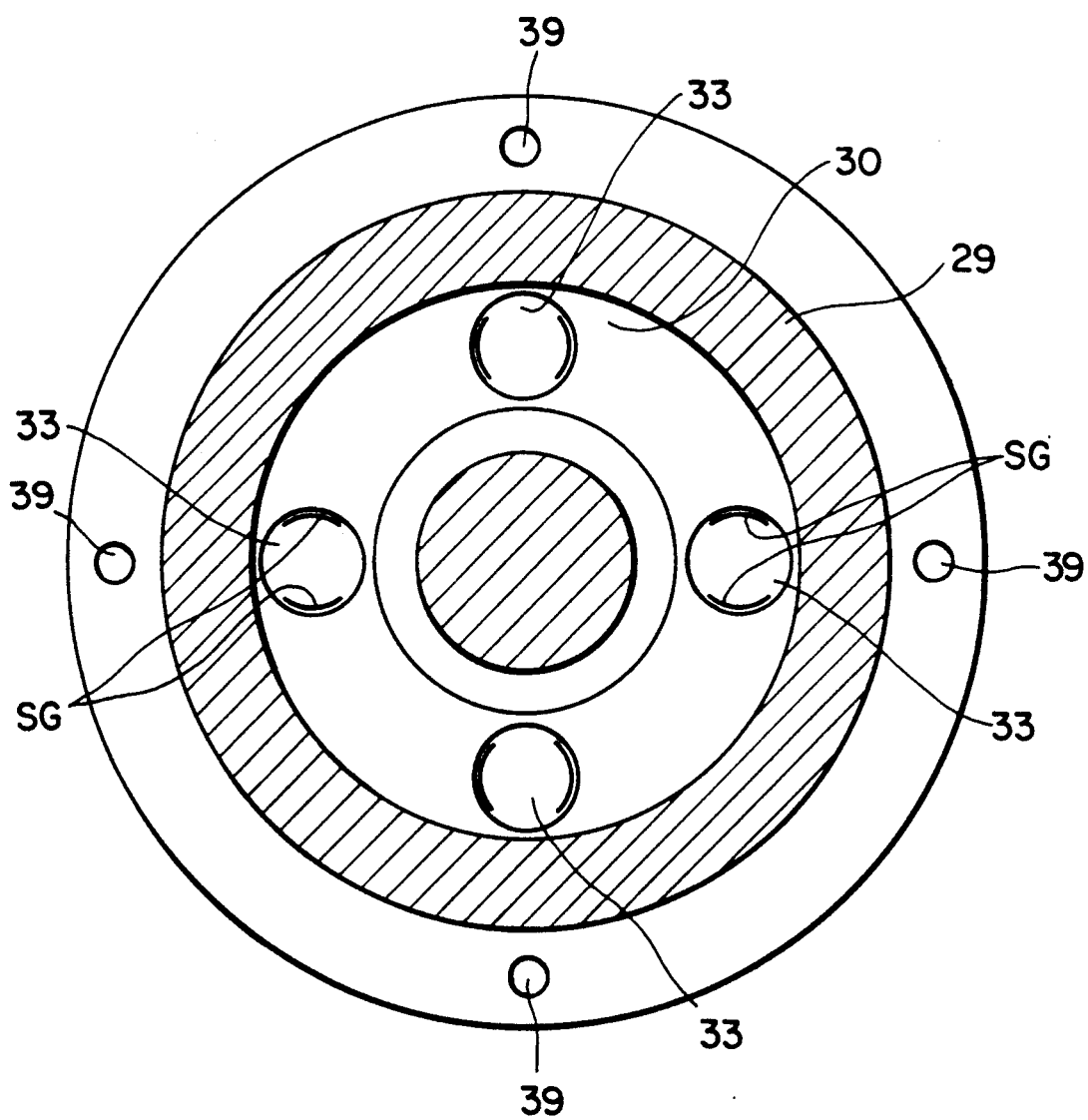
FIG. 4 is a cross sectional view taken along the line 4 to 4 of FIG. 3.

FIG. 3 is a cross-sectional front view, from the right-side, of the construction of the load cell according to the present invention, and FIG. 4 is a cross sectional view taken along the line 4 to 4 of FIG. 3.

The basic construction of the load cell 27 according to the second embodiment is the same as that of the load cell 9 according to the first embodiment. More specifically, the load cell 27 is provided with a load introduction section 28, a load support section 29, ring-shaped grooves 30 and 31, a strain sensing section 32, through holes 33, and strain gauges SG, as in the first embodiment.

The difference between the first embodiment and the second embodiment is that four through holes 33 are provided in the second embodiment, compared to the eight provided in the first embodiment, and the cross sectional configuration of the ring-shaped grooves 30 and 31 is substantially V-shaped in the first embodiment but the bottom surface is flat and almost U-shaped in the second embodiment.

Further, the load cell 27 according to the second embodiment is not provided with the parallelogram diaphragms, provided in the first embodiment, and therefore a ring-shaped cover 34 is provided as a cap to cover the ring-shaped groove 30 of the load cell 27, and the height of the back of the load receiving seat 35 is lowered.

The base plate 36 according to the second embodiment comprises a pair of an upper plate-shaped rigid section 37 and a lower plate-shaped rigid section 38. The lower plate-shaped rigid section 38 is formed in larger size and extends outside of the load cell 27 and different from the first embodiment, the bolt through holes 39 are formed in the extended section.

The construction of the load cell according to the second embodiment makes it possible to obtain all of the effects provided by the first embodiment except for the reduction of the influence of a lateral or unbalanced load. In addition, this construction also makes it possible to more easily install the bolts for mounting to the subject to be measured to the base plate 36 due to the enlarged plate-shaped rigid section 38.

The present invention is not limited to the embodiments as described above, and various modifications can be made thereto without departing from the scope of the present invention.

More specifically, in the first embodiment, the load support section 11 and the external cylinder section 17 for the load cell 9 are constructed separately, as described above, but this separate construction can be replaced by an integral one body construction. Similarly, the load support section 11 and the plate-shaped rigid section 24 for the base plate 21 may be constructed as one body. In this case, however, the clearances between the ring-shaped groove 13 and the lower surface of the load introduction section 10 and the plate-shaped rigid section 24 can not be machined by a lathe, and this, the ring-shaped groove and the above clearances must be formed by, for example, the lost wax casting method or the like.

Figure 5:
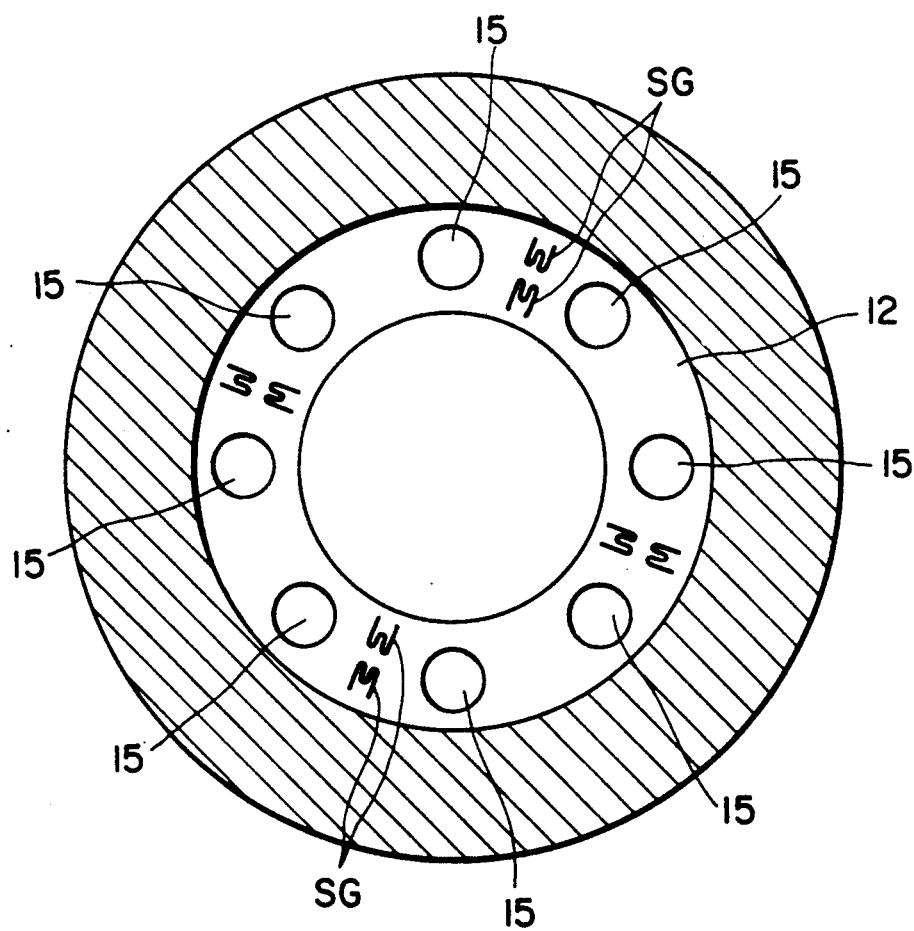
FIG. 5 is transverse cross sectional view which illustrates the construction of a modification of the embodiment described in FIGS. 1 and 2, by a cross sectional view similar to FIG. 2.

With regard to the means for detecting a strain generated at the strain sensing section, the above embodiments a shear stress is detected by a strain gauge. Nevertheless, shown by the modification in FIG. 5, the strain gauges used to detect a bending stress also may be installed on the upper ring-shaped groove 12 and the lower ring-shaped groove (not shown), on both thereof or on the bottom surface of one part, by turning the load sensing axis in the radial direction. In this case, the through holes 15 can be omitted.

Although not described herein, the through holes used to supply a bridge voltage to the strain gauges (in practice, a Wheatstone bridge circuit composed of the strain gauges) or to introduce the strain detection output obtained at the strain gauges, through an electric cable to the outside of the load cell 9, are formed in the side wall of the load support section 11, for example, and a waterproof connector or the like is fitted into the through hole as a seal.

The configuration of the strain sensing section is not limited to the embodiments described above, and either straight beam or cross-shaped beam can be used therefor.

What is claimed is:

1. A load cell with a base plate able to detect a load by using strain gauges and to convert the magnitude of a load into a quantity of electricity, comprises:

a load sensing section formed by a rigid load introduction section having a cylindrical shape and an axial center thereof conforming to a load axis, and a rigid load support section formed so as to surround said load introduction section at a specified distance, and a strain sensing section extending from said load introduction section in a radial direction and having an inner end integratedly linked to said load introduction section and an outer end integratedly linked to said load support section, and, being elastically deformed when a force is exerted on said load introduction section along the load axis when said load support member is supported, and a base plate having a neck formed in the middle thereof in such a manner that the center conforms to said load axis and two parallel plate-shaped rigid sections are formed in such a manner that they can clamp said neck;

wherein one part of the plate-shaped rigid section of said base plate is brought into contract with and integratedly fixed to said load support section, and strain gauges are mounted on said strain sensing section formed on said load sensing section so as to detect a load applied to said load introduction section and convert the magnitude of a measured load into a quantity of electricity.

2. A load cell with a base plate as defined in claim 1, wherein two thin diaphragms are arranged in parallel to each other and integratedly linked at a specified distance in such a manner that they connect the outer periphery of a member integrated with a load introduction section to the inner periphery of a member integrated with a load support section.

3. A load cell with a base plate as defined in claim 1, wherein one part of a plate-shaped rigid section, which is not fixed to a load sensing section, from the two plate-shaped rigid sections of the base plate is formed into large-size flange shape and a plurality of through holes are formed in the peripheral edge of the flange, into which mounting bolts are screwed to fix the main body of a load cell holding a subject to be measured.

* * * * *